(12) United States Patent
Dharwada et al.

(10) Patent No.: US 8,572,502 B2
(45) Date of Patent: Oct. 29, 2013

(54) BUILDING CONTROL SYSTEM USER INTERFACE WITH DOCKING FEATURE

(75) Inventors: Pallavi Dharwada, Minneapolis, MN (US); SankaTandav Krishna, Atlanta, GA (US)

(73) Assignee: Honeywell International Inc., Morristown, NJ (US)

(*) Notice: Subject to any disclaimer, the term of this patent is extended or adjusted under 35 U.S.C. 154(b) by 855 days.

(21) Appl. No.: 12/276,276

(22) Filed: Nov. 21, 2008

(65) Prior Publication Data
US 2010/0131877 A1   May 27, 2010

(51) Int. Cl.
*G06F 3/048* (2013.01)

(52) U.S. Cl.
USPC ............................. 715/764; 715/733; 715/734

(58) Field of Classification Search
USPC ................... 715/733–736, 764, 777
See application file for complete search history.

(56) References Cited

U.S. PATENT DOCUMENTS

| | | |
|---|---|---|
| 4,375,637 A | 3/1983 | Desjardins |
| 4,816,208 A | 3/1989 | Woods et al. |
| 5,042,265 A | 8/1991 | Baldwin et al. |
| 5,161,387 A | 11/1992 | Metcalfe et al. |
| 5,385,297 A | 1/1995 | Rein et al. |
| 5,390,206 A | 2/1995 | Rein et al. |
| 5,768,119 A | 6/1998 | Havekost et al. |
| 5,929,761 A | 7/1999 | Van der Laan et al. |
| 5,946,303 A | 8/1999 | Watson et al. |
| 5,955,946 A | 9/1999 | Beheshti et al. |
| 6,124,790 A | 9/2000 | Golov et al. |
| 6,178,362 B1 | 1/2001 | Woolard et al. |
| 6,185,483 B1 | 2/2001 | Drees |
| 6,223,544 B1 | 5/2001 | Seem |
| 6,295,527 B1 | 9/2001 | McCormack et al. |
| 6,314,328 B1 | 11/2001 | Powell |
| 6,351,213 B1 | 2/2002 | Hirsch |
| 6,356,282 B2 | 3/2002 | Roytman et al. |
| 6,420,968 B1 | 7/2002 | Hirsch |
| 6,430,712 B2 | 8/2002 | Lewis |
| 6,473,407 B1 | 10/2002 | Ditmer et al. |
| 6,492,901 B1 | 12/2002 | Ridolfo |
| 6,535,122 B1 | 3/2003 | Bristol |
| 6,549,135 B2 | 4/2003 | Singh et al. |
| 6,675,591 B2 | 1/2004 | Singh et al. |

(Continued)

FOREIGN PATENT DOCUMENTS

| | | |
|---|---|---|
| WO | WO 01/97146 | 12/2001 |
| WO | WO 02/052432 | 7/2002 |

(Continued)

OTHER PUBLICATIONS

U.S. Appl. No. 12/643,865, filed Dec. 21, 2009.

(Continued)

*Primary Examiner* — Enrique Iturralde
(74) *Attorney, Agent, or Firm* — Seager Tufte & Wickhem, LLC.

(57) ABSTRACT

Building control systems that include a user interface that is configured to help manage relatively large amounts of building control data in an efficient and intuitive manner. In some cases, subsets of building control information can be associated with display elements such as windows or tabs, which can then be docked to provide a convenient way to selectively display only certain subsets of the building control information.

19 Claims, 15 Drawing Sheets

(56) References Cited

U.S. PATENT DOCUMENTS

| | | | |
|---|---|---|---|
| 6,681,156 B1 | 1/2004 | Weiss | |
| 6,690,980 B2 | 2/2004 | Powell | |
| 6,813,587 B2 | 11/2004 | McIntyre et al. | |
| 6,816,811 B2 | 11/2004 | Seem | |
| 6,870,141 B2 | 3/2005 | Damrath et al. | |
| 6,879,253 B1 | 4/2005 | Thuillard | |
| 6,892,546 B2 | 5/2005 | Singh et al. | |
| 6,919,809 B2 | 7/2005 | Blunn et al. | |
| 6,947,972 B2 | 9/2005 | Chun | |
| 6,955,302 B2 | 10/2005 | Erdman, Jr. | |
| 6,973,627 B1 | 12/2005 | Appling | |
| 6,990,821 B2 | 1/2006 | Singh et al. | |
| 7,024,283 B2 | 4/2006 | Bicknell | |
| 7,062,389 B2 | 6/2006 | Johnson et al. | |
| 7,068,931 B2 | 6/2006 | Tokunaga | |
| 7,069,181 B2 | 6/2006 | Jerg et al. | |
| 7,085,674 B2 | 8/2006 | Iwasawa | |
| 7,113,085 B2 | 9/2006 | Havekost | |
| 7,171,287 B2 | 1/2007 | Weiss | |
| 7,243,044 B2 | 7/2007 | McCalla | |
| 7,250,856 B2 | 7/2007 | Havekost et al. | |
| 7,277,018 B2 | 10/2007 | Reyes et al. | |
| 7,345,580 B2 | 3/2008 | Akamatsu et al. | |
| 7,426,697 B2 * | 9/2008 | Holecek et al. | 715/788 |
| 7,457,869 B2 | 11/2008 | Kernan | |
| 7,460,020 B2 | 12/2008 | Reyes et al. | |
| 7,581,192 B2 * | 8/2009 | Stabb et al. | 715/781 |
| 7,596,613 B2 | 9/2009 | Silverthorne et al. | |
| 7,653,459 B2 | 1/2010 | Pouchak et al. | |
| 7,783,990 B2 * | 8/2010 | Amadio et al. | 715/809 |
| 7,819,334 B2 | 10/2010 | Pouchak et al. | |
| 7,826,929 B2 | 11/2010 | Wacker | |
| 7,882,448 B2 * | 2/2011 | Haug | 715/779 |
| 8,000,814 B2 * | 8/2011 | Havekost et al. | 700/17 |
| 8,108,785 B2 * | 1/2012 | Matthews et al. | 715/764 |
| 2002/0123864 A1 * | 9/2002 | Eryurek et al. | 702/188 |
| 2003/0028269 A1 * | 2/2003 | Spriggs et al. | 700/83 |
| 2003/0101009 A1 | 5/2003 | Seem | |
| 2003/0171851 A1 | 9/2003 | Brickfield et al. | |
| 2004/0051739 A1 * | 3/2004 | Schmickley et al. | 345/772 |
| 2004/0143510 A1 | 7/2004 | Haeberle et al. | |
| 2004/0165010 A1 * | 8/2004 | Robertson et al. | 345/805 |
| 2005/0038571 A1 | 2/2005 | Brickfield et al. | |
| 2005/0043862 A1 | 2/2005 | Brickfield et al. | |
| 2005/0193285 A1 | 9/2005 | Jeon | |
| 2005/0203490 A1 | 9/2005 | Simonson | |
| 2005/0283738 A1 * | 12/2005 | Beringer et al. | 715/777 |
| 2006/0136558 A1 | 6/2006 | Sheehan et al. | |
| 2006/0168013 A1 | 7/2006 | Wilson et al. | |
| 2006/0224989 A1 * | 10/2006 | Pettiross et al. | 715/779 |
| 2006/0253205 A1 | 11/2006 | Gardiner | |
| 2007/0186175 A1 * | 8/2007 | Hudson, Jr. | 715/764 |
| 2008/0010049 A1 | 1/2008 | Pouchak et al. | |
| 2008/0016493 A1 | 1/2008 | Pouchak et al. | |
| 2008/0115153 A1 | 5/2008 | Brindle | |
| 2008/0125914 A1 | 5/2008 | Wacker | |
| 2009/0062964 A1 * | 3/2009 | Sullivan et al. | 700/276 |
| 2009/0077055 A1 * | 3/2009 | Dillon et al. | 707/5 |
| 2009/0113037 A1 | 4/2009 | Pouchak | |
| 2010/0100583 A1 | 4/2010 | Pouchak | |
| 2010/0106543 A1 | 4/2010 | Marti | |
| 2010/0131877 A1 | 5/2010 | Dharwada et al. | |
| 2010/0287130 A1 | 11/2010 | Guralnik et al. | |
| 2011/0010654 A1 | 1/2011 | Raymond et al. | |

FOREIGN PATENT DOCUMENTS

| | | |
|---|---|---|
| WO | WO 03/090038 | 10/2003 |
| WO | WO 2004/053772 | 6/2004 |
| WO | WO 2004/055608 | 7/2004 |
| WO | WO 2004/070999 | 8/2004 |
| WO | WO 2005/020167 | 3/2005 |
| WO | WO 2006/048397 | 5/2006 |
| WO | WO 2007/024622 | 3/2007 |
| WO | WO 2007/024623 | 3/2007 |
| WO | WO 2007/027685 | 3/2007 |
| WO | WO 2007/082204 | 7/2007 |

OTHER PUBLICATIONS

U.S. Appl. No. 12/703,476, filed Feb. 10, 2010.
U.S. Appl. No. 12/722,364, filed Mar. 11, 2010.
U.S. Appl. No. 12/792,547, filed Jun. 2, 2010.
U.S. Appl. No. 12/822,997, filed Jun. 24, 2010.
U.S. Appl. No. 12/977,701, filed Dec. 23, 2010.
Honeywell Spyder Bacnet User's Guide, 242 pages, Revised Jul. 2009.
Honeywell Spyder User's Guide 202 pages, Released Jul. 2007.
http://blogs.msdn.com/b/khen1234/archive/2005/05/11/416392. aspx, "Regular Expressions in T-SQL," 4 pages, May 11, 2005.
http://en.wikipedia.org/wiki/JAR_(file_format), "JAR (file Format)—Wikipedia, the Free Encyclopedia," 3 pages, printed Dec. 26, 2009.
Siemens, BACnet for DESIGO 27 Pages, prior to Dec. 30, 2009.
Tridium, "NiagaraAX Product Model Overview," 7 pages, 2005.
Tridium, "Tridium & Niagara Framework Overview," 9 pages, prior to Oct. 28, 2008.
http://www.google.com/maps, "Google Maps, Pin Location," 1 page, prior to Nov. 21, 2008.
Microsoft Word Screen Shots, 2 pages, prior to Nov. 21, 2008.
Adobe Acrobat 6.0 Standard, Version 6.0.2, Screenshots, 2 pages, May 18, 2004.
Honeywell, "Excel Building Supervisor-Integrated R7044 and FS90 Ver. 2.0," Operator Manual, 70 pages, Apr. 1995.
Trane, "System Programming, Tracer Summit Version 14, BMTW-SVP01D-EN," 623 pages, 2002.

* cited by examiner

BUILDING CONTROL SYSTEM USER INTERFACE WITH DOCKING FEATURE

TECHNICAL FIELD

This disclosure relates generally to building control systems, and more particularly to the user interface of a building control system.

BACKGROUND

Building control systems may provide a large amount of data pertaining to HVAC equipment, security alarms, refrigeration monitoring and/or the like. In some instances, building control systems may provide such information for a large number of sites that can be within different portions of a building or within different buildings. The buildings may even be geographically scattered. Individuals charged with operating these building control systems, such as alarm managers or building superintendents, for example, may have to monitor events at multiple sites and/or diagnose and/or fix a large number of potential problems in a short amount of time.

It will be appreciated that the amount of information presented to the individual may become overwhelming. There is a need for a building control system that provides the individual with organizational tools that help manage the relatively large amounts of building control data in an efficient and intuitive manner.

SUMMARY

This disclosure relates generally to building control systems, and more particularly to building control systems that include a user interface that is configured to help manage relatively large amounts of building control data in an efficient and intuitive manner.

In an illustrative but non-limiting example, a building control system may include a building control program that has access to building control information, and can display at least selected building control information on a display via a user interface. Sometimes through interaction with the user interface, a first set of building control information may be associated with a first display element on the display. The first display element may correspond to, for example, a window, a tab, an icon or any other suitable display element. Likewise, a second set of building control information may be associated with a second display element. The second display element may correspond to, for example, a window, a tab, an icon or any other suitable display element. In some cases, the first set of building control information may correspond to, for example, one or more building control parameters from a first geographic site or location, and the second set of building control information may correspond to one or more building control parameters from a second geographic site or location, but this is not required. The first set of building control information may be displayed when the first display element is selected for display, and the second set of building control information may be displayed when the second display element is selected for display. It is contemplated that additional sets of building control information may be associated with other corresponding display elements, as desired.

To help manage the building control information in an efficient and intuitive manner via the user interface, one or more of the first display element and the second display element may be docked in a docking display element. In some cases, the docking display element is displayed on the display when one or more of the first display element and the second display element are docked in the docking display element. The docking display element may provide a convenient way to "dock" the first display element and/or the second display element. The first display element may be docked when, for example, the user does not wish to display the first set of building control information but still wants to maintain easy access to the first set of building control information such as when subsequent monitoring of the information is anticipated or desired. Likewise, the second display element may be docked when, for example, the user does not wish to display the second set of building control information but still wants to maintain easy access to the second set of building control information. In some cases, the first display element and/or the second display element may be docked manually by the user or automatically upon the occurrence of a detected qualifying event.

The above summary is not intended to describe each and every disclosed embodiment or every implementation of the disclosure. The Description that follows more particularly exemplify the various illustrative embodiments.

BRIEF DESCRIPTION OF THE FIGURES

The following description should be read with reference to the drawings. The drawings, which are not necessarily to scale, depict selected embodiments and are not intended to limit the scope of the disclosure. The disclosure may be more completely understood in consideration of the following detailed description of various embodiments in connection with the accompanying drawings, in which.

Figure 1:
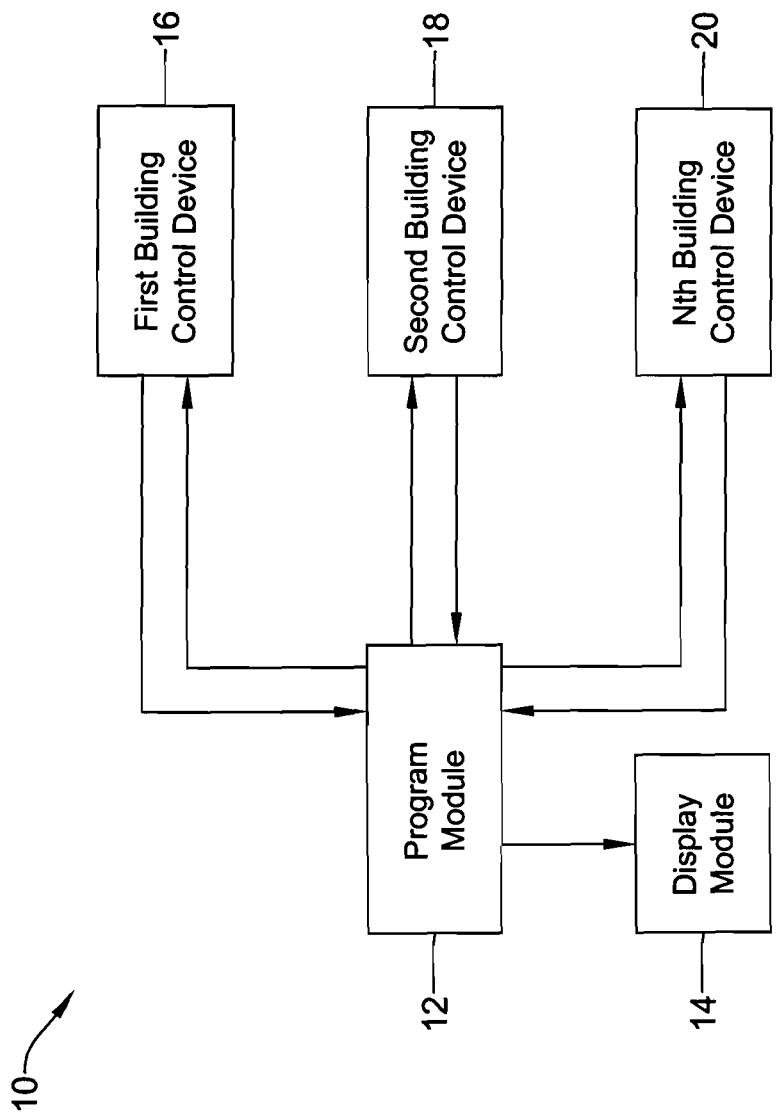
FIG. 1 is a schematic view of an illustrative but non-limiting building control system.

While the invention is amenable to various modifications and alternative forms, specifics thereof have been shown by way of example in the drawings and will be described in detail. It should be understood, however, that the intention is not to limit the invention to the particular illustrative embodiments described. On the contrary, the intention is to cover all modifications, equivalents, and alternatives falling within the spirit and scope of the invention.

DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

FIG. 1 is a schematic view of an illustrative but non-limiting building control system 10. The illustrative building control system 10 may include a program module 12 and a display module 14. In some instances, program module 12 represents software that is running on a computer such as a server, or perhaps a general purpose computer such as a desktop, laptop or workstation. Display module 14 may represent a display device such as an LCD display, a CRT monitor, or the like, that is connected to the computer facilitating program module 12. In some cases, display module 14 may be a distinct computer that is located remotely from the computer facilitating program module 12, but may also be disposed proximate the aforementioned computer. In some instances, display module 14 may represent a remote computer display, via a thin client (such as Microsoft Internet Explorer™ or equivalent) that can display information provided over a network from program module 12.

Building control system 10 may include a few or even up to thousands of building control devices. For illustrative purposes, building control system 10 is shown here with a first building control device 16, a second building control device 18 and an $N^{th}$ building control device 20, where N is an integer higher than two, and may be as high as several or even many thousands. Each building control device 16, 18, 20 can be seen as being in communication with program module 12. Communication with each building control device 16, 18, 20 may be accomplished in any suitable manner. In some cases, at least some of the building control devices 16, 18, 20 may be in communication with program module 12 over a network such as a telephone network, a local area network (LAN), a wide are network (WAN) or even the Internet. In some instances, it is contemplated that at least some of the building control devices 16, 18, 20 may be in wireless communication with program module 12. The building control devices may be the same or different, and in some cases, may represent a wide variety of different devices. Illustrative but non-limiting examples include thermostats, other HVAC controllers, security alarm controllers, motion sensors, temperature sensors, pressure sensors, high temperature limit sensors and/or any other suitable device.

Building control system 10 may be configured to assist a user in viewing and/or organizing a potentially substantial amount of building control information that may be obtained from the one or more of building control devices 16, 18 and 20. For example, program module 12 may create or otherwise provide a user interface that includes graphical and/or alphanumerical display elements that may be associated with particular building control information. The display elements may be display windows, tabs, icons and the like. In some instances, program module 12 may permit the user to "dock" a display element and its associated building control information when, for example, the user does not wish to display the associate building control information, but still wants to maintain easy access to the associated building control information such as when subsequent monitoring of the information is anticipated or desired. If and/or when the user wants once again display the associated building control information, they may do so by simply selecting the appropriate display element from a docking display element.

In one example, program module 12 may associate a first set of building control information (e.g. certain building control information from a first site) with a first display element, and may associate a second set of building control information (e.g. certain building control information from a second site) with a second display element. In some cases, additional display elements may be associated with additional sets of building control information. If the first display element has been selected, such as by clicking on the first display element, the first set of building control information may be displayed on the display via display module 14. If the second display element is selected, the second set of building control information may be displayed on the display via display module 14.

It will be appreciated that reference to a first display element and a second display element is merely illustrative, as there may be tens, hundreds or even thousands of potential display elements associated with a similar number of distinct sets of building control information. Moreover, a first display element may be considered as referring to a particular display element (associated with a particular set of building control information) while a second display element may be considered as referring to a subsequent particular display element (associated with a subsequent particular set of building control information).

In some instances, display module 14 may display a docking display element. If a user desires, they can "dock" the first display element and/or the second display element in the docking display element. The docking display element may, for example, include a graphical and/or alphanumeric representation or indication of which display elements, if any, are presently docked in the docking display element. In some instances, one or more display elements assigned or associated with sets of building control information that are not being displayed or desired to be displayed may be docked in the docking display element. One or more display elements that are assigned or associated with sets of building control information that are being displayed and/or are desired to be displayed may not be docked in the docking element. In some cases, the docking display element is only displayed via display module 14 when at least one display element is currently docked, but this is not required. It is contemplated, for example, that the docking display element may be displayed at all times. In some cases, the docking display element may provide an indication of which of the one or more display elements are presently docked in the docking display element.

Figure 2:
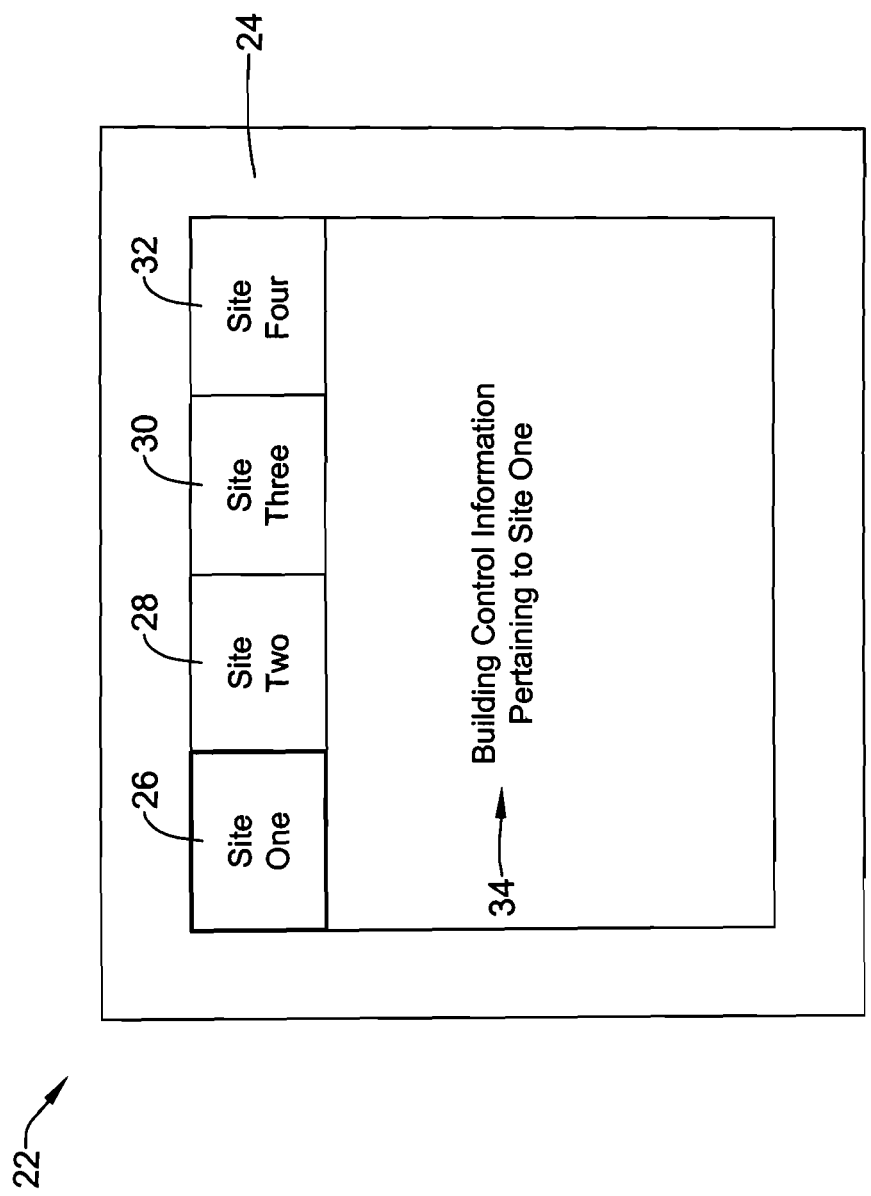
FIGS. 2 through 6 are diagrammatic views of illustrative displays that may be generated by the building control system of FIG. 1.

FIGS. 2 through 6 provide generalized examples of displays that may be generated by program module 12 (FIG. 1) and displayed via display module 14 (FIG. 1). FIG. 2 provides a user interface display 22 that may be displayed via display module 14. Display 22 includes a display window 24 and several tabs arrayed along a top of the display window 24. It will be appreciated that this is merely illustrative, as the tabs, when provided, could be displayed along the bottom, sides or at any other location of the display window 24. As illustrated, there is a SITE ONE tab 26, a SITE TWO tab 28, a SITE THREE tab 30 and a SITE FOUR tab 32, while in other instances there may be fewer or perhaps more tabs displayed. It is to be understood that reference to one, two and so on is not intended to be strictly interpreted as building site numbers, but rather as generally referring to adjacent, sequentially or otherwise organized and/or referenced building control data. It will be appreciated that each of the tabs may be assigned or correspond to a particular building control device, such as building control device 16, 18 or 20 (FIG. 1), groups of building control devices such those located at particular building sites, and/or any other building control data. More generally, tabs 26, 28, 30 and 32 are non-limiting examples of the aforementioned first and second display elements.

In some instances, the tabs may include labels other than "SITE ONE", "SITE TWO" and so on. In some cases, the tabs may include more specific labels, referring instead, for example, to specific building control devices, two or more of which may be located at a common site. In some instances, the tabs may refer to specific HVAC equipment, to security alarms, temperature sensors and the like. It will be appreciated, therefore, that reference to "SITE ONE", "SITE TWO" and the like is merely illustrative and is not intended to be limiting in any way.

Figure 3:
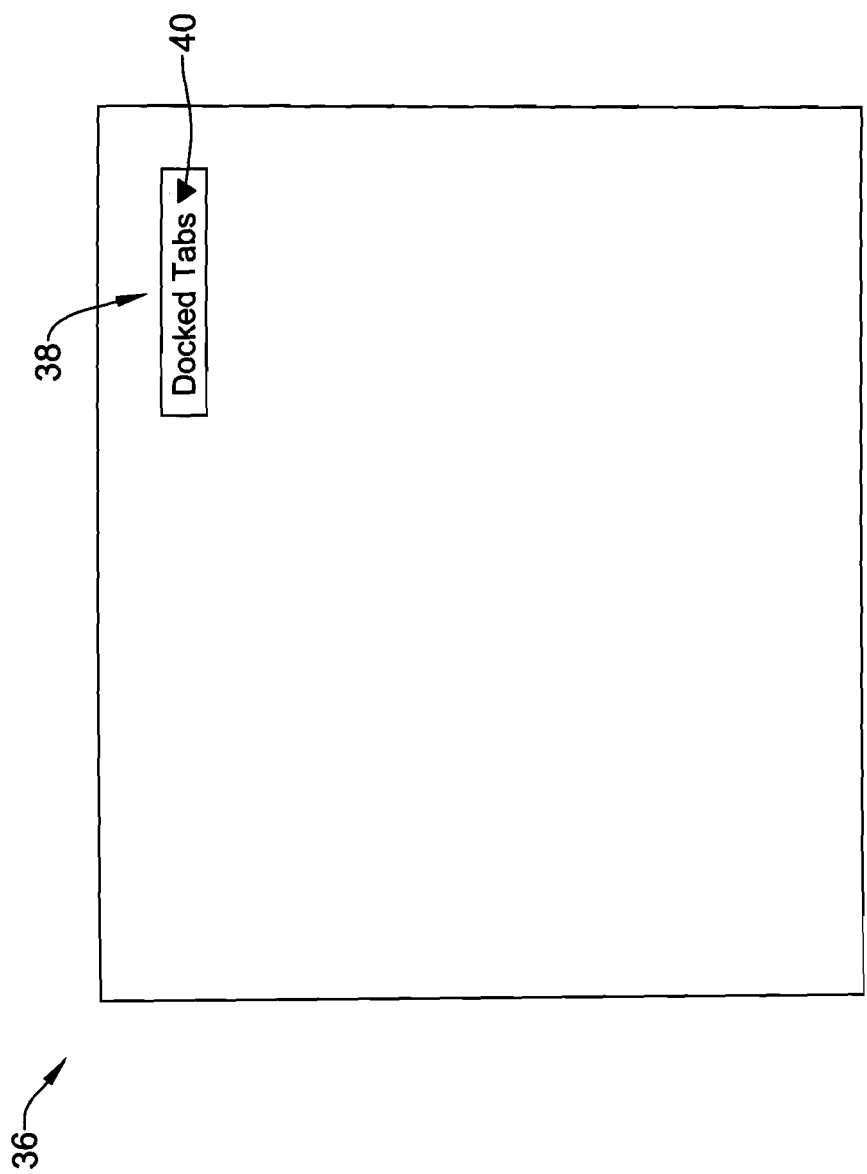

SITE ONE tab 26 can be seen to be highlighted, indicating that it has been selected via the user interface. As a result, and in the illustrative embodiment, display window 24 displays text 34, icons, graphs, and/or any other suitable building control information that is related, assigned or otherwise associated with the SITE ONE tab 26. It will be appreciated that one may select another tab simply by clicking on or otherwise selecting the desired tab, which will cause program module 12 to display via display module 14 the appropriate information within display window 24. In some cases, one or more of the tabs may, as noted above, be docked into a docking element. FIG. 3 provides a generalized view of an illustrative docking element.

FIG. 3 shows a display 36 that may be displayed via display module 14 (FIG. 1). Display 36 includes a docking display element 38. In some instances, docking display element 38 may include a graphical and/or alphanumeric indication showing what has been docked. In some cases, docking display element 38 may include a button 40 that can be used to expand docking display element 38 so that the user may see what tab or tabs are currently docked in the docking display element 38. This can be seen, for example, in FIG. 4, which shows a screen 42 that may be displayed via display module 14 when button 40 is selected by the user via the user interface.

Figure 4:
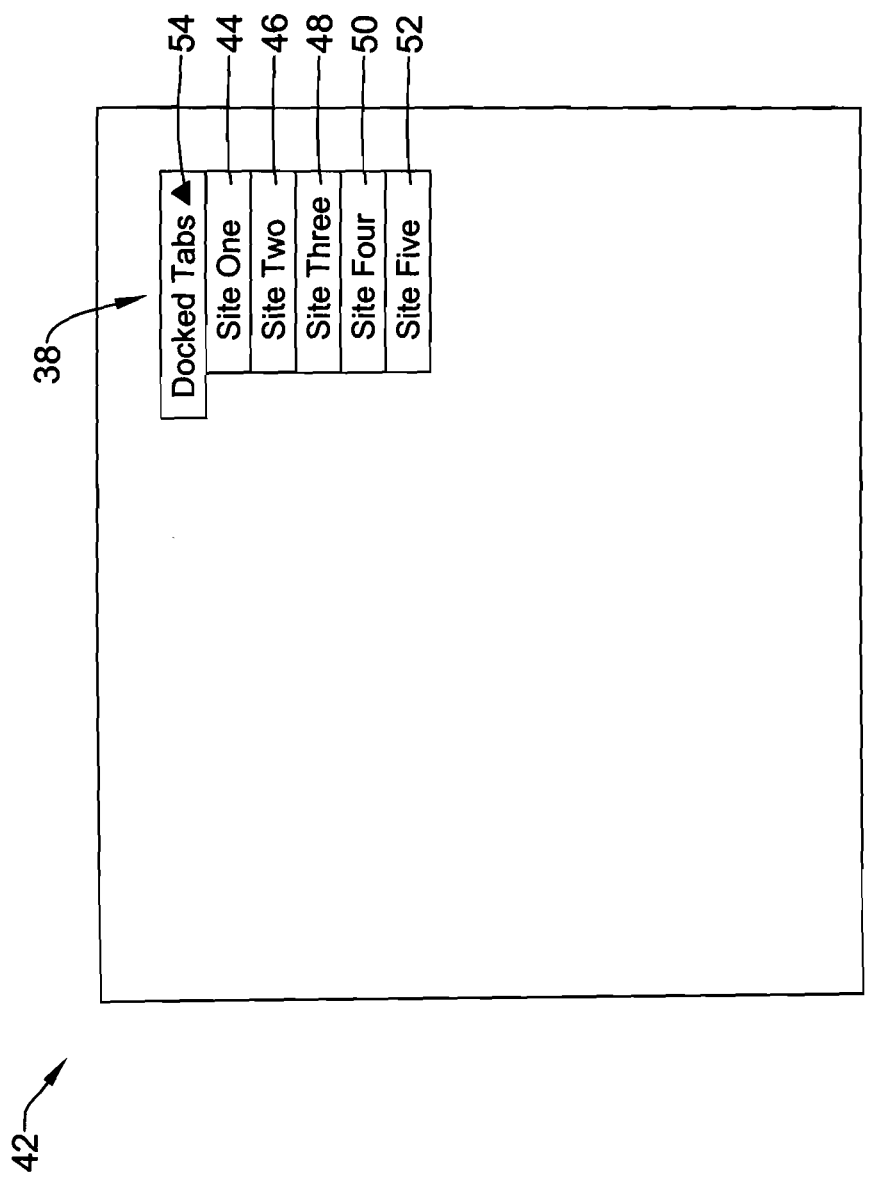

In FIG. 4, docking display element 38 has been expanded, presumably by a user clicking on or otherwise selecting button 40 shown in FIG. 3. As a result, the illustrative docking display element 38 now shows a SITE ONE indicator 44, a SITE TWO indicator 46, a SITE THREE indicator 48, a SITE FOUR indicator 50 and a SITE FIVE indicator 52. In some cases, docking display element 38 may include a button 54 that can be used to once again minimize docking display element 38, such as shown in FIG. 3. Clicking on one of the indicators 44, 46, 48, 50 or 52 may cause program module 12 (FIG. 1) to once again display via display module 14 (FIG. 1) the particular tab to which the indicator corresponds, along with the corresponding set of building control information.

In some instances, one or more tabs may be docked in the docking display element 38 upon a qualifying event. For example, non-limiting examples of a qualifying event includes exceeding a number of simultaneously displayed display elements on the display. For example, a qualifying event may be triggered if the number of tabs shown in FIG. 2 exceeded five tabs. In some cases, the qualifying number of displayed elements may be predetermined. In other instances, the qualifying number of displayed elements may be a user-settable parameter controlled by program module 12 (FIG. 1). In some cases, the qualifying number of displayed elements may be determined at least in part upon the display characteristics available to display module 14 (FIG. 1).

In some instances, a user may have opened more tabs than can be displayed at one time. For example, there may be ten open tabs, while only five can be displayed at one time due to spatial limitations. In this situation, five tabs may be docked while five tabs may be open, or undocked. If the user opens another tab, say an eleventh tab, this may cause one of the currently displayed tabs to be docked. In some cases, the most recently opened tab may be docked while in other cases, it may be the first opened tab that is docked to make room for the newly opened tab. When and how particular tabs are docked or undocked may be controlled by building control system 10 (FIG. 1), and/or may be controlled by user-definable parameters, if desired.

In some cases, a qualifying event may constitute lateral movement within a hierarchal building control menu. Moving from one spot within the menu to another spot on the menu, at the same hierarchal level as the first spot, may trigger docking of one or more of the displayed display elements. In some instances, closing the docking display element may close any presently docked display elements, but this is not required.

In some instances, a display mode of a docking display element such as docking display element 38 may be changed from displaying the indication 44, 46, 48, 50, 52 of the one or more of the first display element and second display element that are docked in the docking display element 38 to not displaying the indication of the one or more of the first display element and second display element that are docked in the docking display element. In some cases, the display mode of the docking display element 38 may be set or changed based on user preferences.

In some instances, when a first display element is docked in the docking display element 38, selecting the indication (e.g. indication 44) of the first display element in the docking display element 38 selects the first display element for display and displays the first set of building control information on the display 42. In some cases, when a second display element is docked in the docking display element 38, selecting the indication (e.g. indication 46) of the second display element in the docking display element 38 selects the second display element for display and displays the second set of building control information on the display 42.

Figure 5:
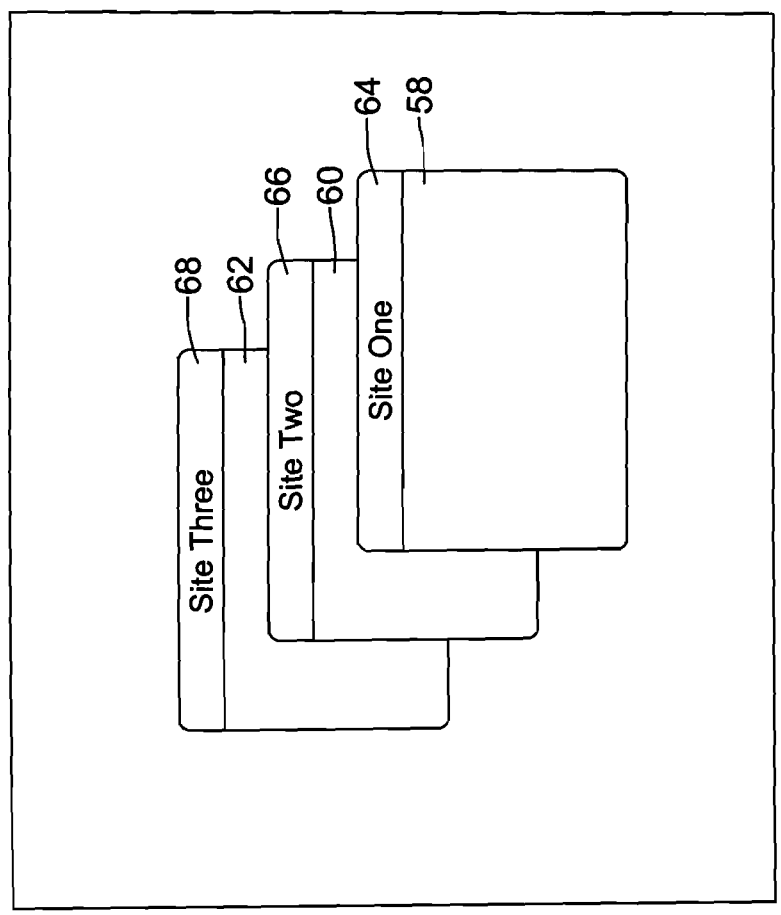

FIG. 5 shows a display 56 that may be displayed via display module 14 (FIG. 1). Illustrative display 56 includes a SITE ONE window 58, a SITE TWO window 60 and a SITE THREE window 62. In this, it will be recognized that one, two, and three are arbitrary and are merely intended to refer, for example, to adjacent, sequentially or otherwise organized and/or referenced building control data. SITE ONE window 58 may be seen as including a label 64, SITE TWO window 60 may be seen as including a label 66 and SITE THREE window 62 may be seen as including a label 68. The labels 64, 66 and 68 may provide a graphical and/or alphanumeric representation or indication of the particular building control information that is provided in each of the corresponding windows 58, 60 and 62. Moreover, the labels 64, 66 and 68 may serve as display elements that can be used to move around windows 58, 60 and 62 on display 56, and/or can be used to open or close particular windows 58, 60 and 62.

Figure 6:
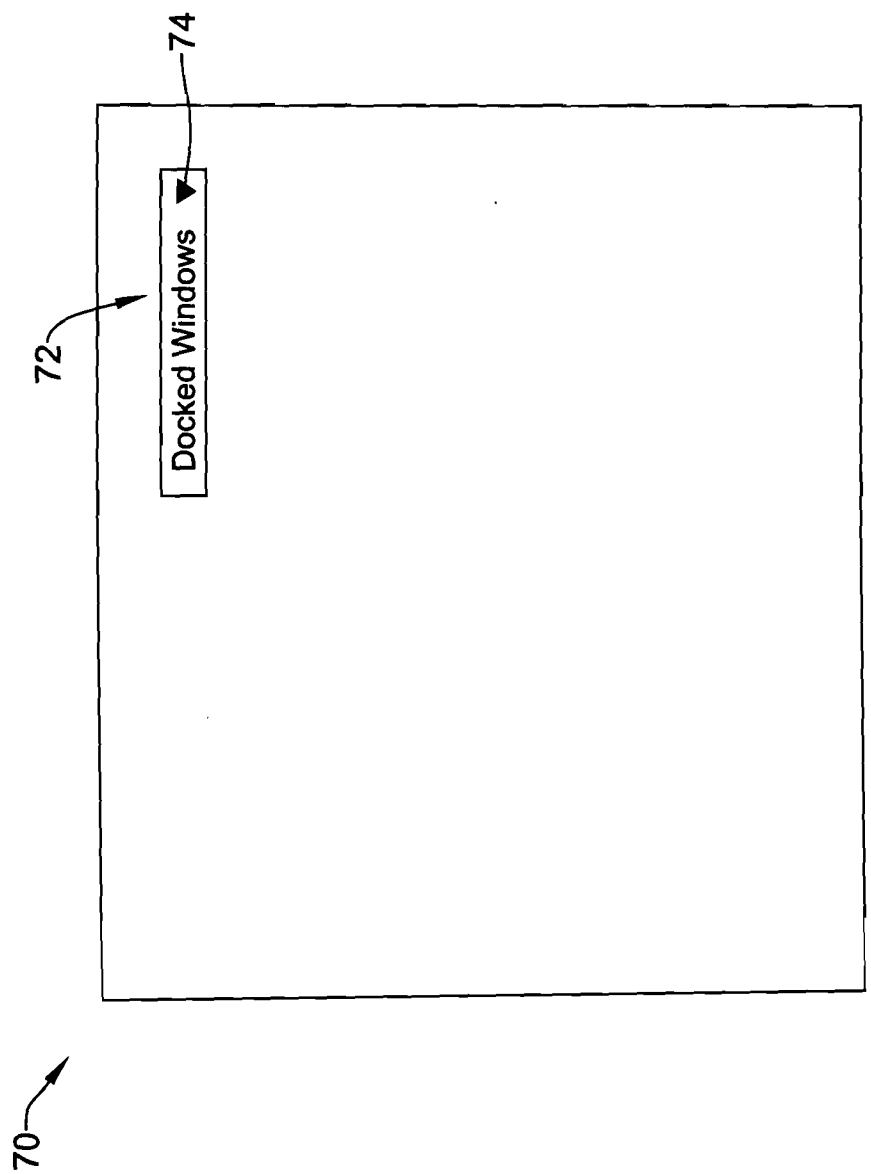

FIG. 6 shows a display 70 that may be displayed via display module 14 (FIG. 1). Illustrative display 70 may include a docking display element 72 that may be displayed when one or more of SITE ONE window 58, SITE TWO window 60 and/or SITE THREE window 62 are docked. In some cases, docking display element 72 may include a button 74 that, if clicked or otherwise selected, may cause docking display element 72 to expand (not illustrated) to show the display elements (e.g. windows 58, 60 and 62) that are docked within docking display element 72, similar to that shown in FIG. 4.

Figure 7:
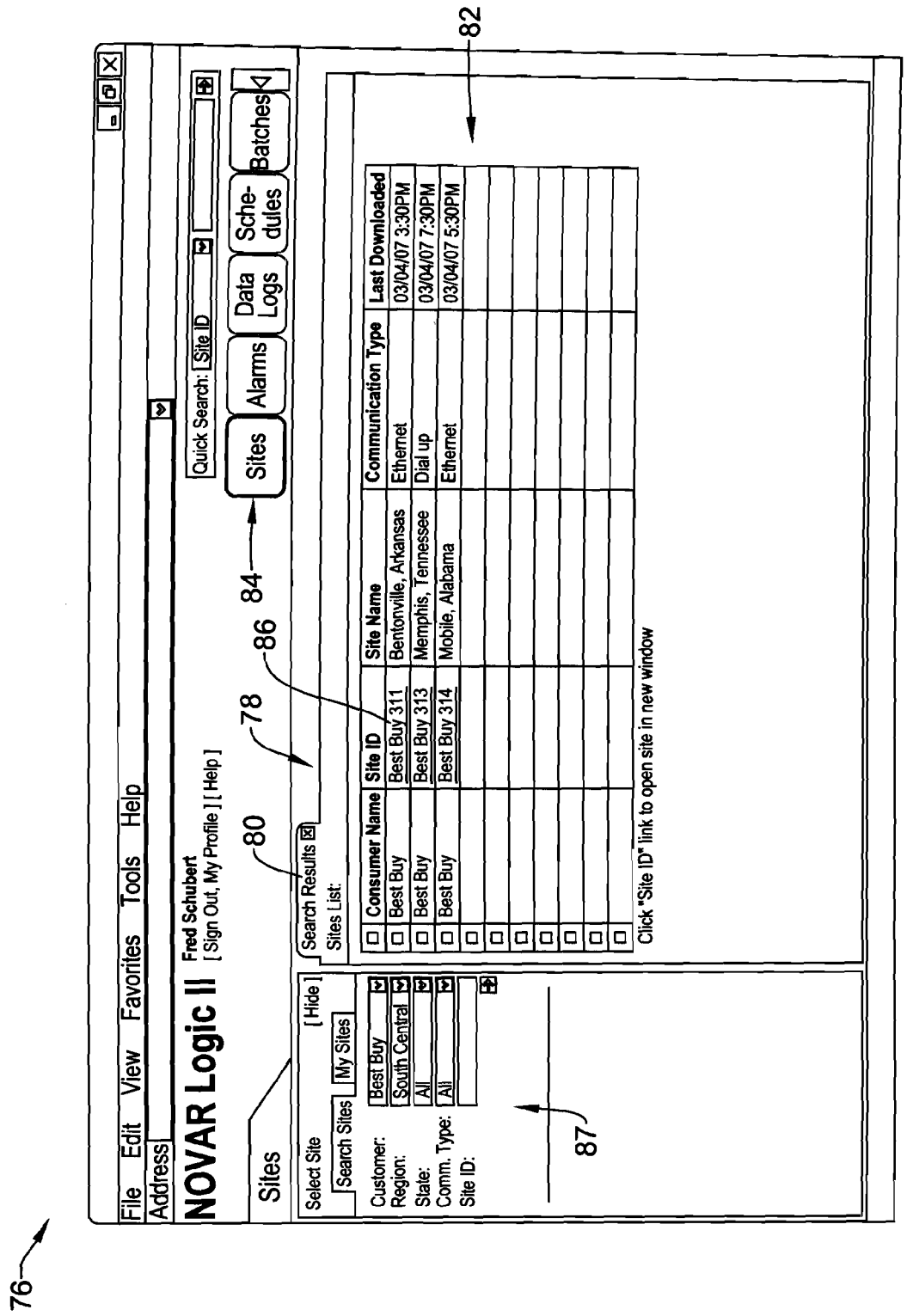
FIGS. 7 through 9 are screen captures of illustrative displays that may be generated via the building control system of FIG. 1.
Figure 8:
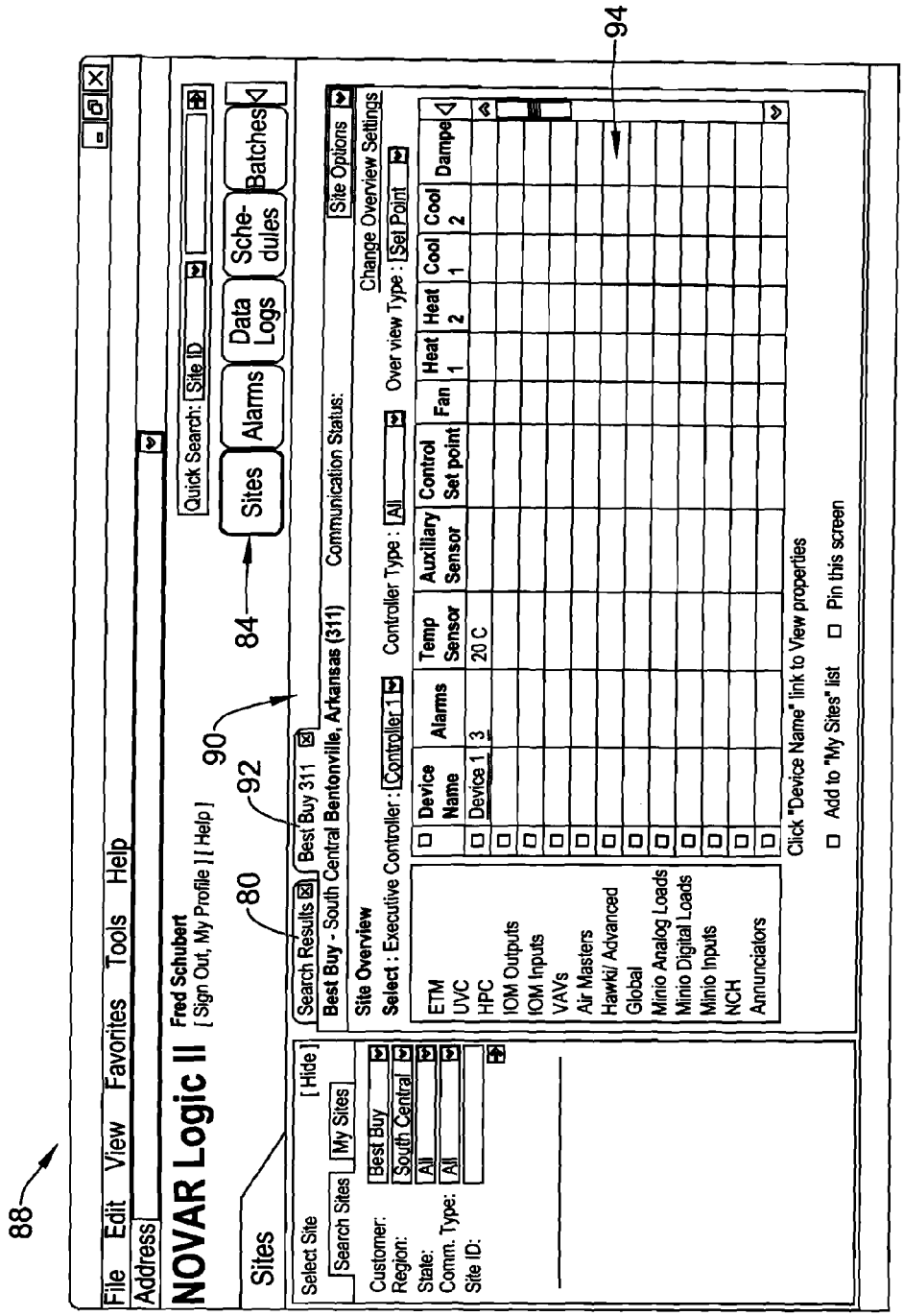
Figure 9:
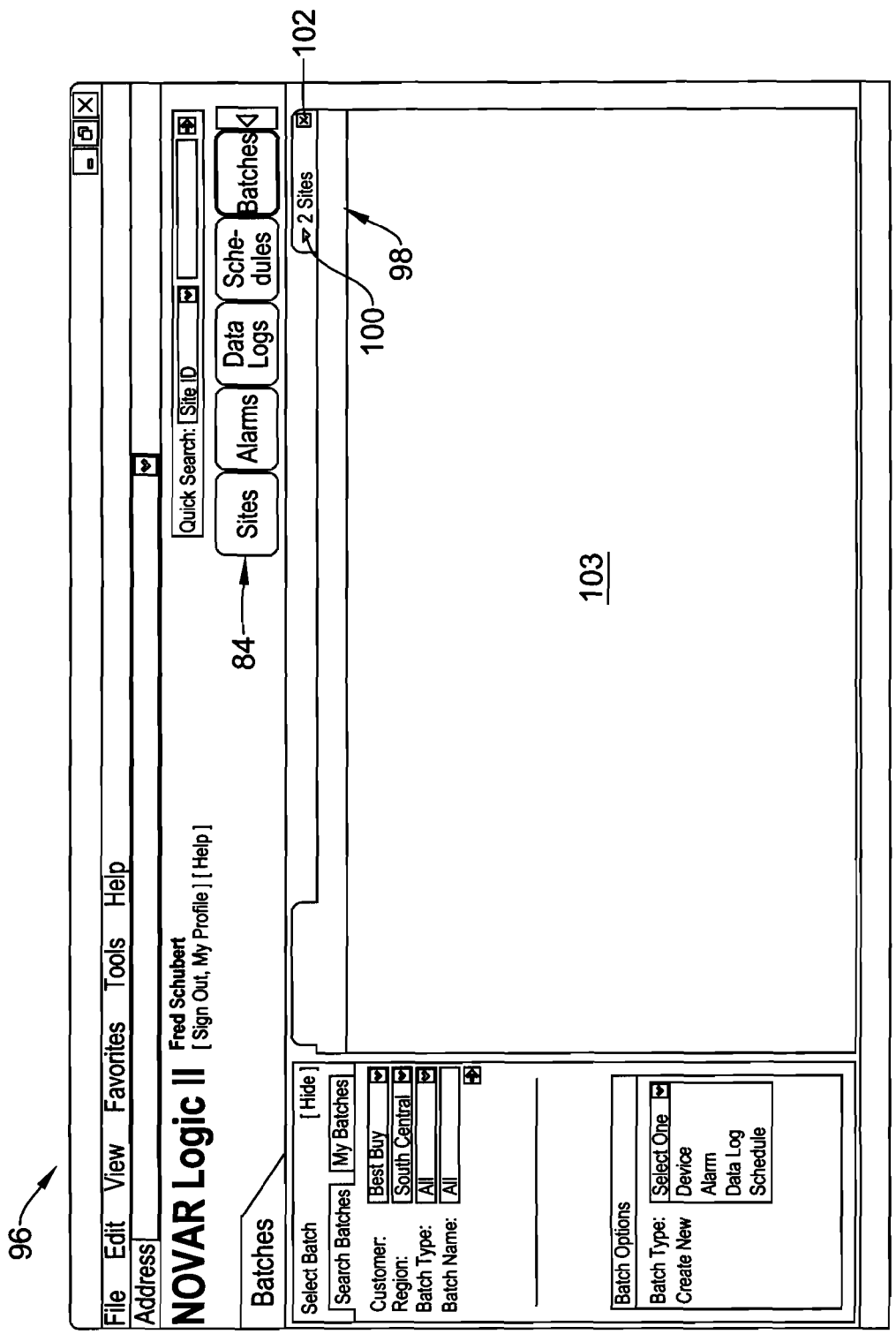

FIGS. 7 through 9 are illustrative but non-limiting screen captures showing displays that may be generated via building control system 10 (FIG. 1). FIG. 7 shows a display 76 that can be seen as including a tabbed display 78. Tabbed display 78 may, as illustrated, include an identifying tab 80 as well as an information display region 82 that provides information pertaining to the building site or building control device or parameters represented by identifying tab 80. Display 76 may include a menu bar 84 that includes buttons for lateral movement within a menu.

In the illustrative screen capture of FIG. 7, a search region 87 is provided to help in selecting one or more subsets of building control information. While a site search region 87 is shown in FIG. 7, it is contemplated that other types of searching, sorting, filtering and/or other mechanism may be use to aid in selecting and associating one or more subsets of building control information with a display region (e.g. tab) may be provided. In the illustrative screen capture, the search region 87 has been used to associate and display the Best Buy customer stores that are located in the South Central Region of the United States in search results tab 80. In some cases, different search criteria may be presented to the user in search region 87 when other menu items (e.g. Alarms, Data Logs, Schedules, or Batches) in menu bar 84 are selected. For discussion purposes, when a user clicks on or otherwise selects active link 86 labeled "BestBuy 311" in FIG. 7, the building control system 10 may display a display 88 as shown in FIG. 8.

In FIG. 8, display 88 can be seen as including identifying tab 80 as well as a new tabbed display 90. Tabbed display 90 may include, as shown, an identifying tab 92 as well an information display region 94. As illustrated, identifying tab 92 has been selected, and thus information display region 94 is being displayed. It will be appreciated that clicking on or otherwise selecting search results tab 80 may cause building control system 10 (FIG. 1) to display information display 82 (see FIG. 7).

While FIGS. 7 and 8 only show one or two identifying tabs 80 and 92, it will be appreciated that display 76 (or display 88) may include three, four, five or more distinct identifying tabs. In some instances, as discussed above, building control system 10 (FIG. 1) may dock one or more of the displayed tabs after a particular number of tabs are to be displayed. In some cases, one or more of the displayed tabs may be docked in response to a user moving laterally through a menu. This may occur, for example, if a person clicks on or otherwise selects one of the menu buttons within menu bar 84. In either event, FIG. 9 provides an illustrative resulting display 98.

In FIG. 9, display 96 includes a docking display element 98. In some cases, as shown, docking display element 98 may include a graphical and/or alphanumeric indication or representation of which and/or how many display elements have been docked therein. In some instances, docking display element 98 may include a button 100 that can, if pressed, cause building control system 10 (FIG. 1) to display a pull-down menu or expanded list of docked display elements (see FIG. 4) so that a user may select a particular display element for display in display region 103.

Docking display element 98 may include a close box 102 that, if clicked or otherwise selected, may cause building control system 10 to close any and all docked display elements. In some cases, docking display element 98 may be disposed within a particular location within display 96, while in other cases, docking display element 98 may float on the screen and thus may be moved and parked in any desired screen location by a user.

FIGS. 10 through 15 are flow diagrams showing illustrative methods that may be carried out using building control system 10 (FIG. 1). In some cases, building control system 10 or at least some aspects thereof may be manifested on a computer such as a server or a general purpose computer such as a desktop or a laptop. In some instances, display module 14 (FIG. 1) may be manifested via a thin client on a general purpose computer.

Figure 10:
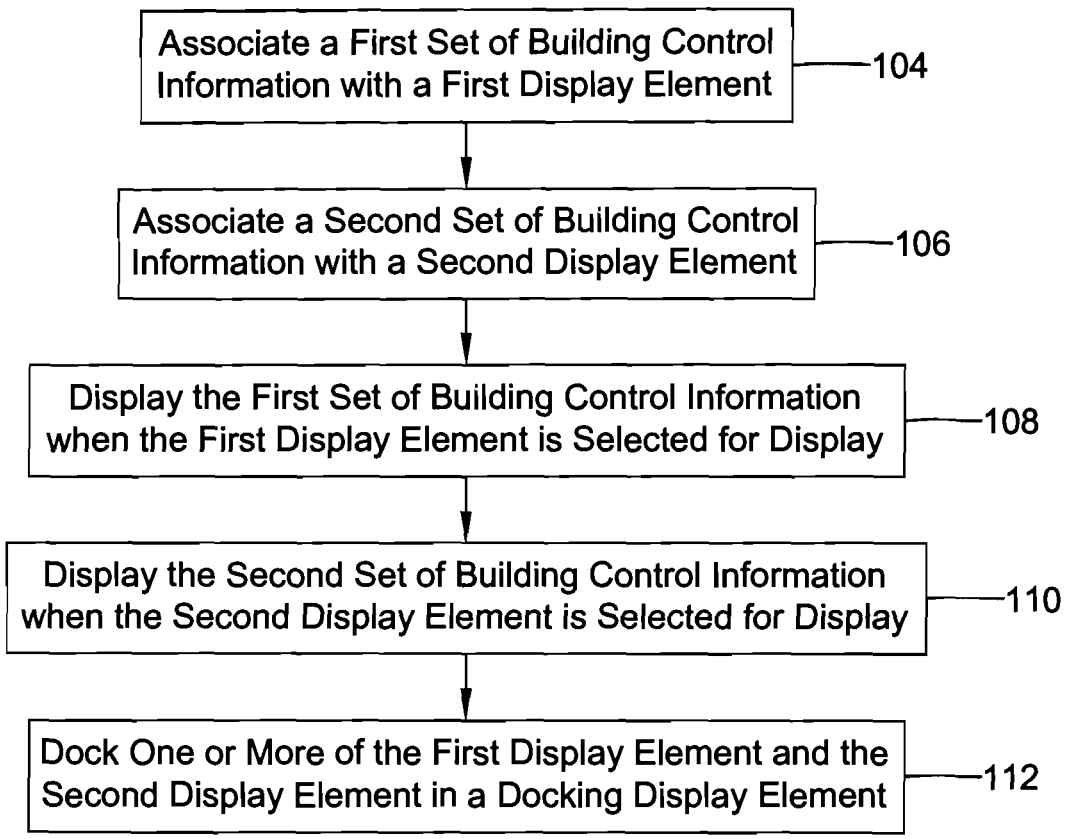
FIGS. 10 through 15 are flow diagrams showing illustrative methods that may be carried out using the building control system of FIG. 1.

In FIG. 10, control begins at block 104, where a first set of building control information is associated with a first display element. The first set of building control information may, for example, pertain to information provided by a particular building control device or particular building control site, but this is not required. At block 106, a second set of building control information is associated with a second display element. The second set of building control information may, for example, pertain to information provided by a particular building control device or particular building control site, but this is not required. The first and second display elements may, for example, be a window, tab, icon or any other suitable display element that can be displayed on a display via display module 14 (FIG. 1), and may include a graphical and/or alphanumeric identification of the building control information that is represented by the particular display element. It will be appreciated that one or more of the blocks described herein may be processed in any order, or even simultaneously.

Control passes to block 108, where building control system 10 (FIG. 1) displays the first set of building control information when the first display element has been selected for display. If the second display element has been selected for display, building control system 10 may display the second set of building control information, as seen at block 110. In some instances, as shown at block 112, one or more of the first display element and the second display element may be docked in a docking display element. In some instances, the docking display element may provide an indication of which of the one or more first display element and/or the second display element are currently docked in the docking display element. When a display element is selected for display, the display element may in some cases be undocked from the display element.

Figure 11:
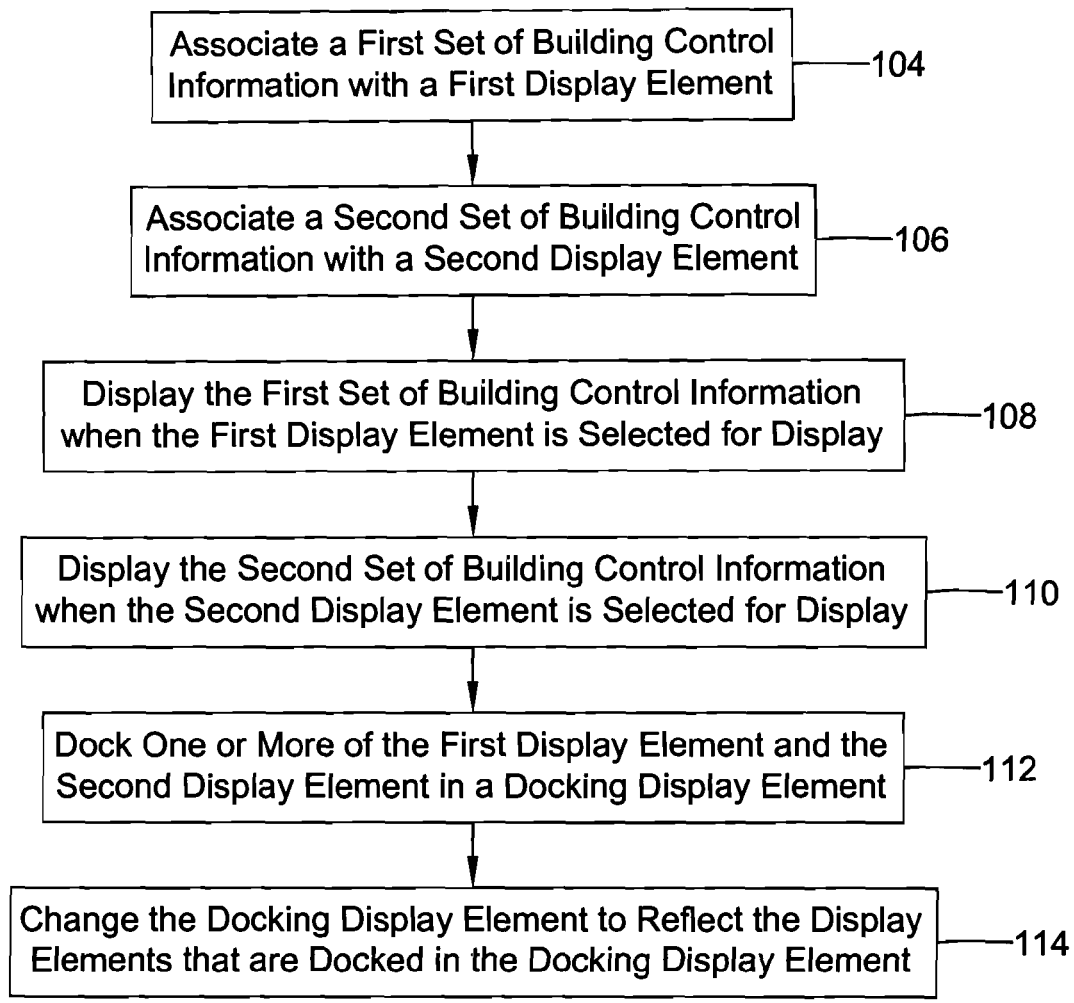

In FIG. 11, control begins at block 104, where a first set of building control information is associated with a first display element. At block 106, a second set of building control information is associated with a second display element. In some cases, each set of building control information pertains to a particular building control device, a particular set of building control devices, a particular building site or any other set or group of building control information. Control passes to block 108, where building control system 10 (FIG. 1) displays the first set of building control information when the first display element has been selected for display. If the second display element has been selected for display, building control system 10 may display the second set of building control information, as seen at block 110.

In some instances, as shown at block 112, one or more of the first display element and the second display element may be docked in a docking display element. In response, and at block 114, building control system 10 (FIG. 1) may change the docking display element to reflect the display elements that are docked in the docking display element. For example, building control system 10 may change the docking display element from not displaying the indication of the one or more of the first display element and second display element that are not docked in the docking display element to displaying the indication of the one or more of the first display element and second display element that become docked in the docking display element.

Figure 12:
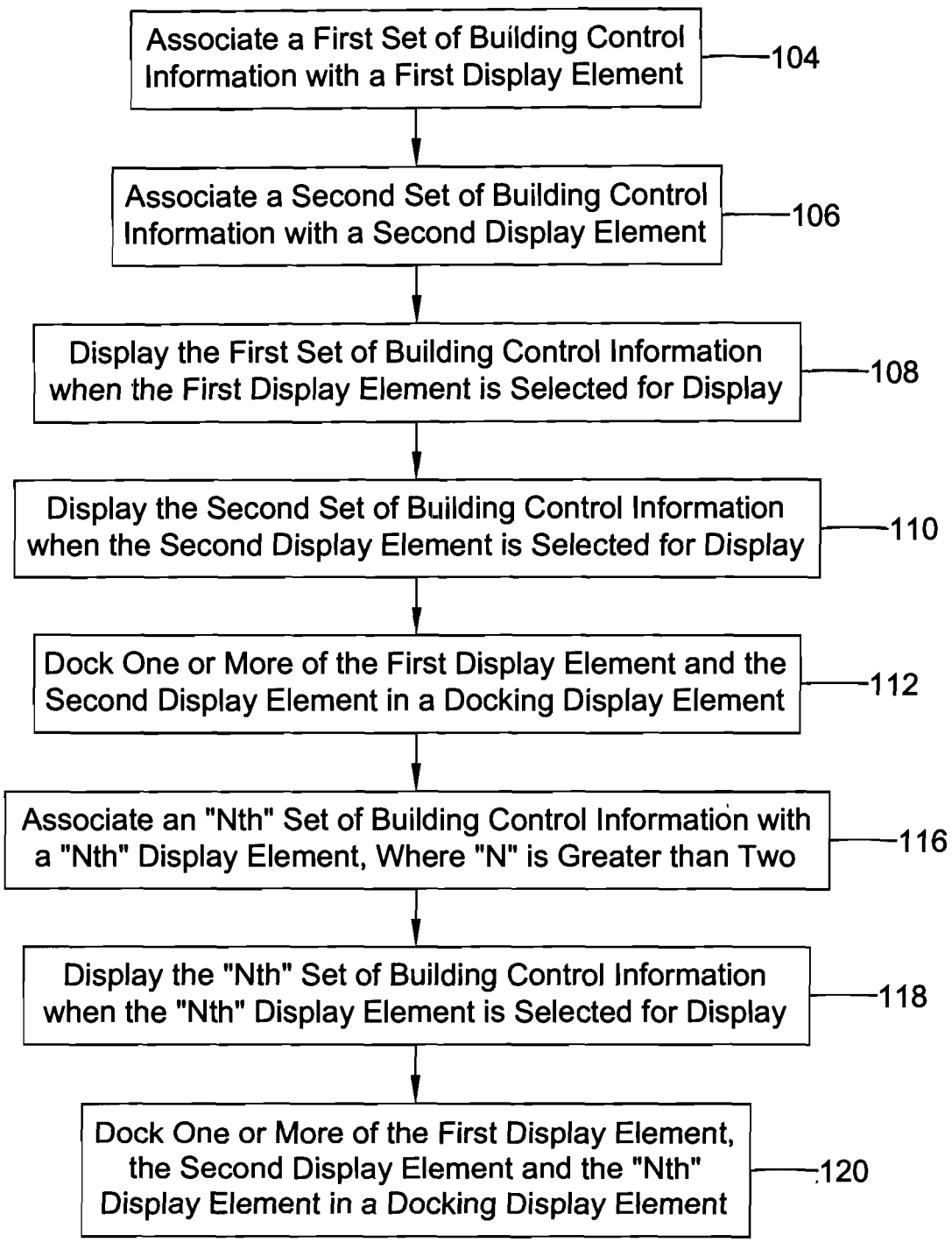

In FIG. 12, control begins at block 104, where a first set of building control information is associated with a first display element. At block 106, a second set of building control information is associated with a second display element. In some cases, each set of building control information pertains to a particular building control device, a particular set of building control devices, a particular building site or any other set or group of building control information. Control passes to block 108, where building control system 10 (FIG. 1) displays the first set of building control information when the first display element has been selected for display. If the second display element has been selected for display, building control system 10 may display the second set of building control information, as seen at block 110. In some instances, as shown at block 112, one or more of the first display element and the second display element may be docked in a docking display element.

At block 116, an $n^{th}$ set of building control information, where n is an integer greater than two, may be associated with an $n^{th}$ display element. The $n^{th}$ set of building control information may pertain to information provided by an $n^{th}$ building control device, an $n^{th}$ set of building control devices, a $n^{th}$ building site or any other set or group of building control information. At block 118, the $n^{th}$ set of building control information is displayed when the $n^{th}$ display element has been selected. One or more of the first display element, the second display element and the $n^{th}$ display element may be docked in a docking display element, as seen at block 120. In some cases, the docking display element is only displayed when a display element is docked therein, but this is not required.

Figure 13:
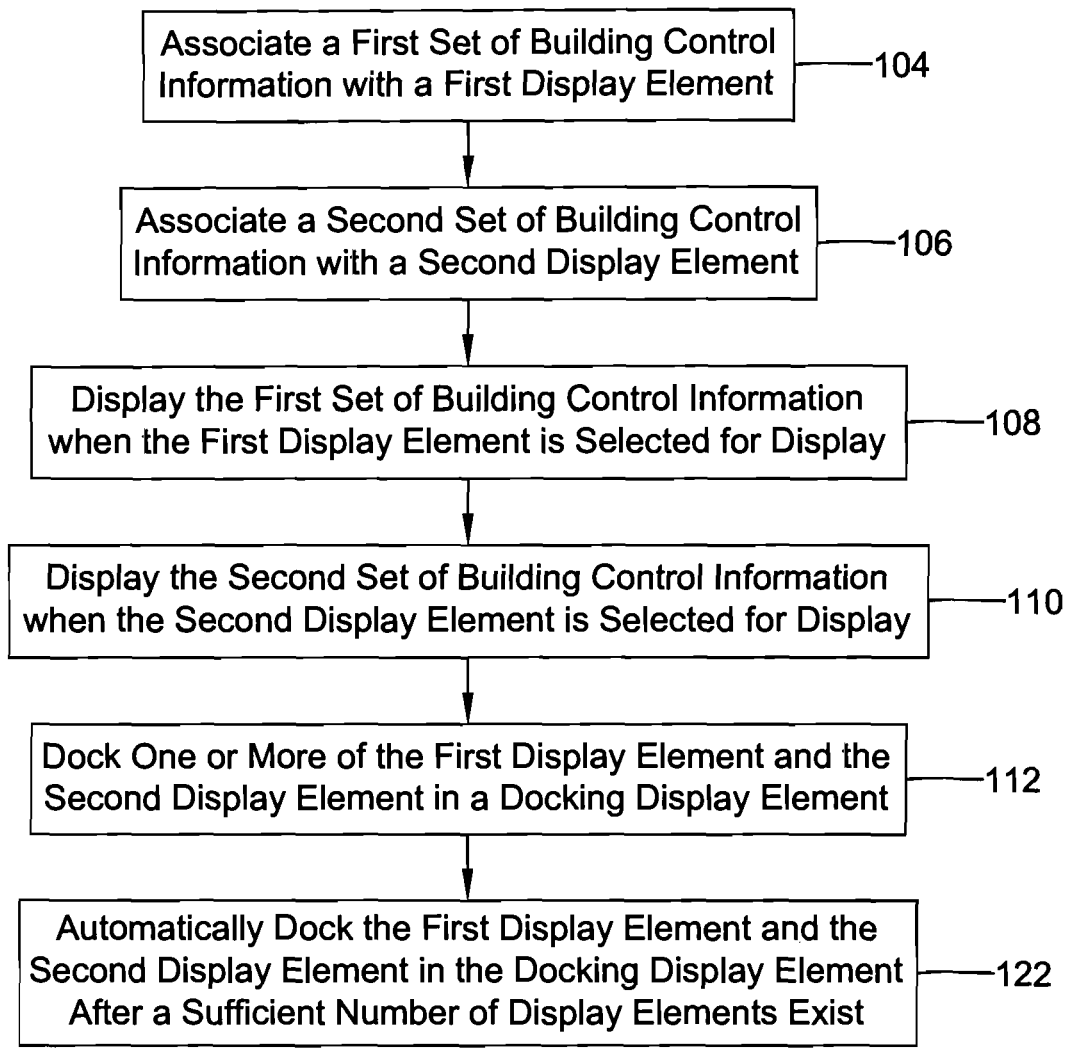

In FIG. 13, control begins at block 104, where a first set of building control information is associated with a first display element. At block 106, a second set of building control information is associated with a second display element. In some cases, each set of building control information pertains to a particular building control device, a particular set of building control devices, a particular building site or any other set or group of building control information. Control passes to block 108, where building control system 10 (FIG. 1) displays the first set of building control information when the first display element has been selected for display. If the second display element has been selected for display, building control system 10 may display the second set of building control information, as seen at block 110. In some instances, as shown at block 112, one or more of the first display element and the second display element may be docked in a docking display element. At block 122, the first display element and the second display element may be automatically docked once a sufficient number of display elements exist or are created by the user. In some cases, the displayed elements may also be automatically docked upon a qualifying event, such as lateral menu movement (e.g. selection of a different menu option from menu bar 84 of FIG. 9).

Figure 14:
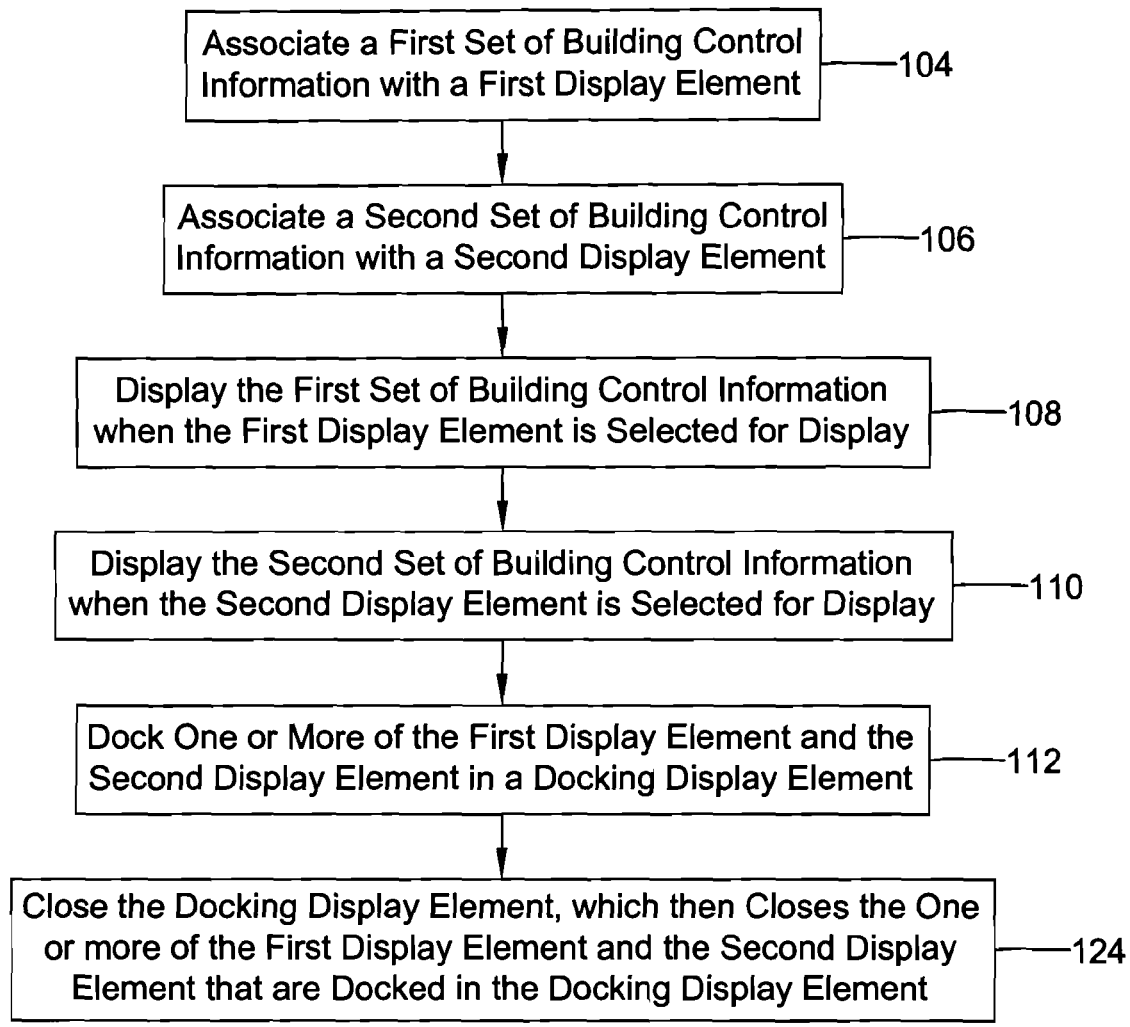

In FIG. 14, control begins at block 104, where a first set of building control information is associated with a first display element. At block 106, a second set of building control information is associated with a second display element. In some cases, each set of building control information may pertain to a particular building control device, a particular set of building control devices, a particular building site or any other set or group of building control information. Control passes to block 108, where building control system 10 (FIG. 1) displays the first set of building control information when the first display element has been selected for display. If the second display element has been selected for display, building control system 10 may display the second set of building control information, as seen at block 110. In some instances, as shown at block 112, one or more of the first display element and the second display element may be docked in a docking display element. As shown at block 124, in some cases, closing the docking display element may cause building control system 10 to close one or more of the display elements that are presently docked. In some cases, this may cause all of the docked display elements to be closed.

Figure 15:
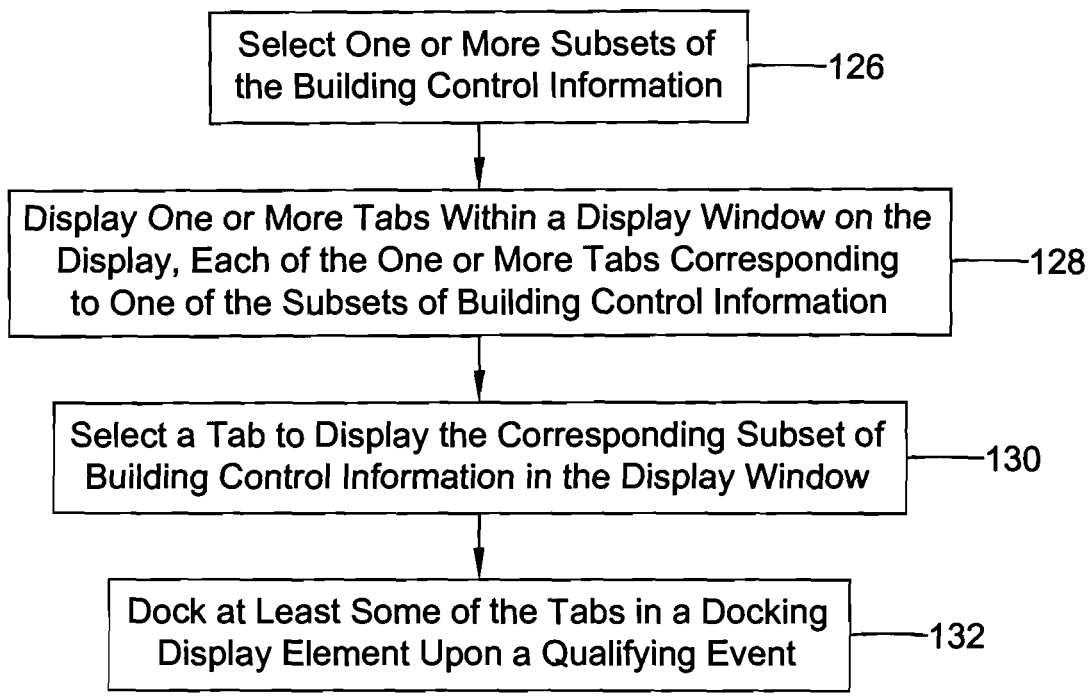

FIG. 15 is a flow diagram showing an illustrative method of organizing and displaying building control information. At block 126, one or more subsets of the building control information may be selected, such as by a user. At block 128, one or more tabs may be displayed within a display window, where each of the one or more tabs corresponds to one of the selected subsets of building control information. The user may, as shown at block 130, select one of the tabs, thereby causing building control system 10 (FIG. 1) to display a corresponding subset of building control information on the display. At block 132, at least some of the displayed tabs may be docked in a docking display element upon a qualifying event such as reaching a particular number of displayed tabs. In some cases, the tabs may be docked automatically.

The disclosure should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

What is claimed is:

1. A method of displaying building control information on a display under the control of a building control program, the method comprising:

the building control program receiving building control information from two or more remotely located building control sites, each building control site located remotely from one another, wherein the building control information received from each of the two or more building control sites is associated with at least one of an HVAC system, a refrigeration system and a security system of the corresponding building control site;

associating at least some of the building control information from a first remotely located building control site with a first display element, the first display element having a first tab;

associating at least some of the building control information from a second remotely located building control site with a second display element, the second display element having a second tab;

simultaneously displaying each of the first tab and the second tab on the display, with each of the first tab and the second tab available for selection by a user;

displaying on the display at least some of the building control information associated with the first building control site when the first tab of the first display element is selected by the user for display;

displaying on the display at least some of the building control information associated with the second building control site when the second tab of the second display element is selected by the user for display;

docking one or more of the first display element and the second display element in a docking display element, and once docked, no longer displaying the corresponding tab on the display;

the docking display element is displayed on the display when one or more of the first display element and second display element are docked in the docking display element; and automatically docking one or more of the first tab and the second tab when the number of simultaneously displayed tabs exceeds a predetermined number.

2. The method of claim 1 further comprising:
executing the building control program on a general purpose computer.

3. The method of claim 2 further comprising:
establishing communication between the general purpose computer and each of the two or more remotely located building control sites.

4. The method of claim 2 wherein the general purpose computer is a server.

5. The method of claim 4, wherein the building control program displays building control information on the display via a thin client executing on a personal computer, laptop or workstation having access to the server.

6. The method of claim 2 wherein the general purpose computer is a personal computer, laptop or workstation.

7. The method of claim 1, wherein the docking display element displays an indication of which of the one or more of the first display element and second display element are currently docked in the docking display element.

8. The method of claim 7, further comprising:
changing a display mode of the docking display element from displaying the indication of the one or more of the first display element and second display element that are docked in the docking display element to not displaying the indication of the one or more of the first display element and second display element that are docked in the docking display element.

9. The method of claim 7 wherein, when the first display element is docked in the docking display element, selecting the indication of the first display element in the docking display element selects the first display element for display and displays at least some of the building control information received from the first building control site on the display.

10. The method of claim 9 wherein, when the second display element is docked in the docking display element, selecting the indication of the second display element in the docking display element selects the second display element for display and displays at least some of the building control information received from the second building control site on the display.

11. The method of claim 7 wherein, when the first display element and the second display element are docked in the docking display element, selecting the indication of the first display element in the docking display element selects the first display element for display and displays at least some of the building control information received from the first building control site on the display, and selecting the indication of the second display element in the docking display element selects the second display element for display and displays at least some of the building control information received from the second building control site on the display.

12. The method of claim 1 further comprising
associating an "nth" set of building control information from an "nth" building control site with a "nth" display element, where "n" is greater than two;
displaying at least some of the "nth" set of building control information when an "nth" tab of the "nth" display element is selected for display;
docking one or more of the first display element, the second display element and the "nth" display element in a docking display element;
wherein the docking display element is displayed on the display when one or more of the first display element, second display element and "nth" display element are docked in the docking display element.

13. The method of claim 1 further comprising:
automatically docking the first display element and the second display element in the docking display element after a sufficient number of display elements exist.

14. The method of claim 1, further comprising:
closing the docking display element, which then closes the one or more of the first display element and the second display element that are docked in the docking display element.

15. The method of claim 1 wherein, when selected for display, the first display element and the second display element each correspond to a tab that is displayed on the display.

16. A method of displaying building control information on a display, comprising:
receiving building control information from two or more remotely located building control sites each remotely located from one another, wherein the building control information is associated with at least one of an HVAC system, a refrigeration system and a security system of the corresponding building control site;
selecting one or more subsets of the building control information, each of the one or more subsets of building control information associated with a different building control site;
displaying one or more tabs within a display window on the display, each of the one or more tabs corresponding to one of the subsets of building control information;
selecting a first tab to display the corresponding subset of building control information in the display window;
sequentially selecting additional tabs to sequentially display their correspond subset of building control information in the display window;
simultaneously displaying each of the first tab and the additional tabs; and
automatically docking one or more of the first tab and the additional tabs when the number of simultaneously displayed tabs exceeds a predetermined number.

17. A building control system comprising:
an input and output block for communicating with two or more remotely located building control sites via a network, wherein each of the two or more remotely located building control sites are remotely located from one another;
a data processing system executing a building control program, the building control program configured to receive building control information from the two or more remotely located building control sites, wherein the building control information from each of the two or more building control sites is associated with at least one of an HVAC system, a refrigeration system and a security system of the corresponding building control site, the building control program further configured to:
associate at least some of the building control information received from a first building control site with a first display element, the first display element having a first tab;
associate at least some of the building control information received from a second building control site with a second display element, the second display element having a second tab;
simultaneously displaying each of the first tab and the second tab on the display, with each of the first tab and the second tab available for selection by a user;
display at least some of the building control information received from the first building control site when the first tab of the first display element is selected for display;
display at least some of the building control information received from the second building control site when the second tab of the second display element is selected for display;
receive selection of additional tabs of additional display elements for display that correspond to building control information associate with additional building control sites;
automatically dock one or more of the first display element and the second display element in a docking display element when the number of displayed tabs of display elements exceeds a predetermined number such that, once docked, the corresponding tab is no longer displayed; and the docking display element is displayed when one or more of the first display element and second display element are docked in the docking display element.

18. The building control system of claim 17, wherein at least some of the building control information received from the first building control site is associated with the first display element through user interaction, and at least some of the building control information received from the second building control site is associated with the second display element through user interaction.

19. The building control system of claim 17, wherein the first display element is selected for display through user interaction, and the second display element is selected for display through user interaction.

\* \* \* \* \*